United States Patent Office 3,354,012
Patented Nov. 21, 1967

3,354,012
PROCESS AND APPARATUS FOR CAPPING FILTER ELEMENTS
Herbert L. Forman, Roslyn Estates, and David B. Pall, Plainview, N.Y., assignors to Pall Corporation, Glen Cove, N.Y., a corporation of New York
Filed Jan. 14, 1964, Ser. No. 337,594
10 Claims. (Cl. 156—69)

ABSTRACT OF THE DISCLOSURE

A process and an apparatus are provided for mass producing filter cartridges. The filter cartridges are produced by progressively moving end caps forward along a conveyor to a point at which an adhesive is applied to them. The adhesive is maintained in a flowable condition and one end of a tubular filter element is embedded therein. The adhesive is then hardened while the element is moved forward such that the bond between the element and the end cap is substantially complete when the cartridge reaches the end of the conveyor line. The filter element, having an end cap on one end thereof is then retrieved, inverted and the other end of the filter element is embedded into and bonded to another end cap in a like manner.

This invention relates to a process and apparatus for capping filter elements, and more particularly to a process for capping tubular or cylindrical filter elements in corrugated form and to apparatus particularly designed for this purpose.

Tubular filter elements as conventionally used are arranged to accept fluid flow from the outside surface of the filter through the filter to the inside, whence the filtrate flow is drawn off. In the manufacture of tubular filter elements from one or more sheets of filter material, it is customary to fold the sheet or sheets into the form of a tube or cylinder, and lap the opposite ends of the material in a side seam, which is bonded with an adhesive coating between the faces. The open ends of the tube are then closed by application of end caps, which are bonded to the tube ends with a suitable adhesive. The caps usually are provided with flanges which embrace the ends of the tube or cylinder, retaining the tube within the flanges, and ensuring a secure leaktight seal. The end caps are provided with apertures, as required for fitting the filter element in the filter assembly, and they may also have portions adapted to receive and seal against a gasket or other sealing means to ensure a tight fit with the pipe connections in the fluid system.

Application of end caps to tubular filter elements is a hand operation which is time consuming, meticulous and troublesome to accomplish. It is necessary to apply the adhesive either to the ends of the tube or to the end caps, fit the end caps to the tube, and maintain pressure upon the composite until a firm bond has been effected. It is absolutely essential that the seal between the end cap and the filter be leakproof, since otherwise unfiltered fluid can bypass the filter at this point, contaminating the filtrate. The end caps also provide structural rigidity to the tube, and in the case of a corrugated tube may also support the folds thereof, retaining them in position. Thus, it is ordinarily essential that a tight seal of high strength be obtained between the end cap and the tube ends.

The labor costs involved in this procedure are considerable, since each of these operations is a hand operation, and the transfer of the filter element from stage to stage of the operation is also effected by hand. Because of the numerous hand-operated stages, the procedure is not foolproof, and many filter elements must be rejected because of faulty seals in the capping.

In accordance with the instant invention, process and apparatus are provided for facilitating the end capping of tubular, such as cylindrical, filter elements, reducing the entire procedure to a semi-automatic series of operations along an assembly line which can be supervised by a single operator. The invention provides a process for automatically feeding end caps to a position at which bonding agent is applied thereto automatically, feeding the thus prepared end caps to a stage at which an operator can apply thereto an end of a tubular filter element, and bonding the capped cylinder in a leakproof seal, curing the bonding agent if necessary, to complete the bond, likewise entirely automatically. The other open end of the tube thus obtained can be capped by a like procedure, after which it is ready for use.

The apparatus in accordance with the invention comprises feeding means for delivering end caps to a stage at which bonding agent is applied, dispensing means for automatically supplying bonding agent to each end cap, stage means for conveying the thus-treated end caps for application of an end of a tubular filter element thereto, and heating means in combination with the stage means at least one portion thereof for effecting a bond between the end cap, bonding agent and tube end. The stage means is arranged for return of a filter element capped at one end to an earlier position for capping at the other end, after which the capped filter element is processed as previously, and the finished element is finally delivered to an accumulation point, at which completed filter elements can be collected for packaging or use.

It will be apparent from the above description that the process and apparatus are adapted for application of any type of bonding agent to any type end cap and tubular filter element. Thermoplastic adhesives which are rendered adhesive merely by softening by application of heat can be employed. There can also be used thermosetting adhesives in an initial thermoplastic stage of polymerization, polymerization to an infusible non-thermoplastic stage being completed in the course of progress of the capped element along the stage by application of heat thereto.

The apparatus and process of the invention are well illustrated in the accompanying drawings.

Figure 1:
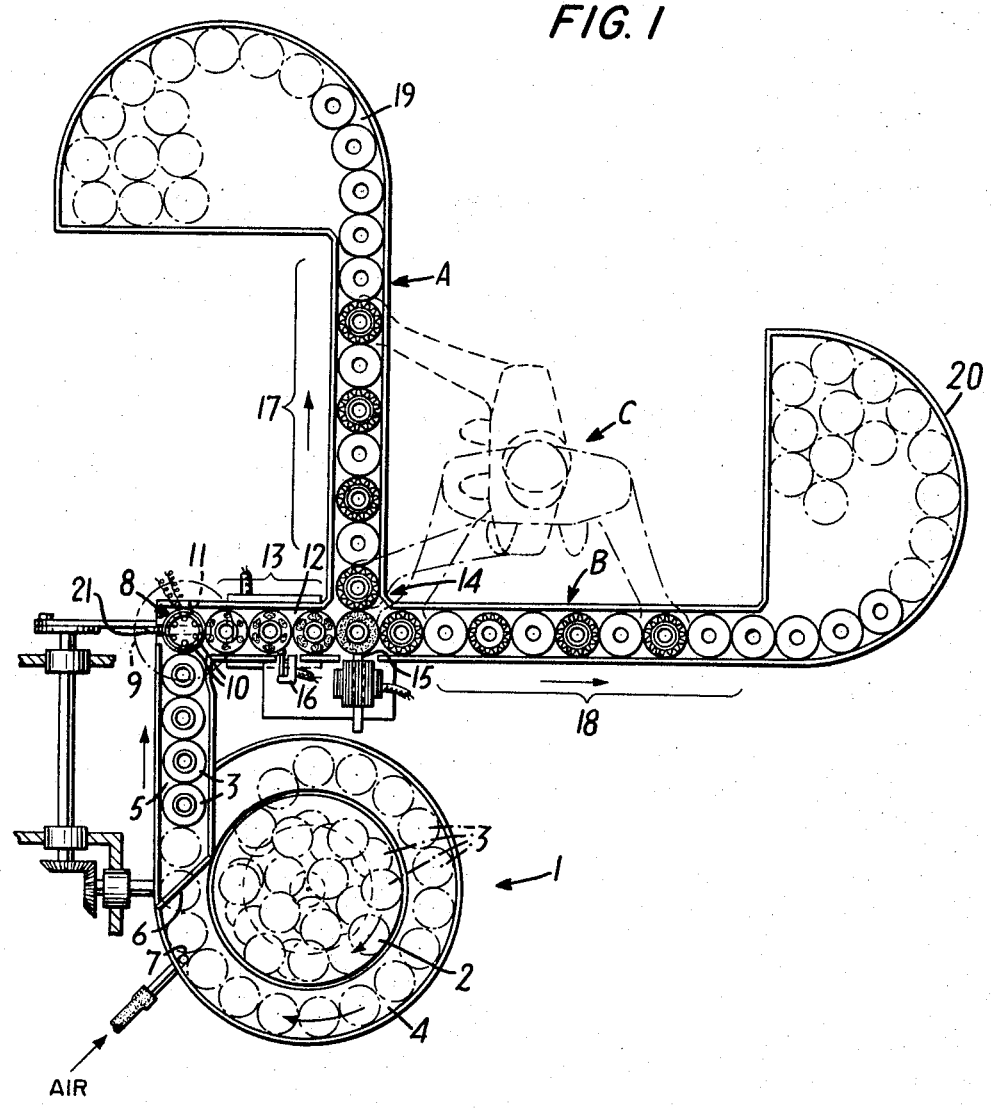
FIGURE 1 is a plan view of an apparatus in accordance with the invention, for automatically feeding end caps to a bonding agent application stage, applying bonding agent thereto, and thence feeding such prepared caps in one of two assembly lines to the tubular filter element capping stage, in sequence, to the final accumulation stage for completed elements.

The apparatus shown in FIGURE 1 comprises a cap feeder 1 of conventional type having a rotatable central storage reservoir 2 containing a supply of end caps 3 and a peripheral helical ramp 4 for carrying the end caps 3 up from the reservoir 2 to a delivery chute 5. As the cap reservoir is rotated, the end caps 3 are continuously delivered to the ramp 4 and this rotation is accompanied by considerable vibration, in accordance with known techniques, to ensure slipping off of excess caps from the ramp 4 to the reservoir 2. Positioned at a point on the ramp adjacent the delivery chute 5 is a feeler 6 which prevents passage of more than one cap at a time beyond this point, and directs any caps piled on top of a cap on the ramp back into the central reservoir. At the feeler, also in conventional manner, an air blast is emitted from beneath through the duct 7 to push any end cap which is not upside down off the ramp 4, back to the reservoir, but to leave undisturbed in position on the ramp a cap which is upside down, in proper position for reception of bonding agent. The device shown is that marketed under the trademark Syntron and known as a Syntron cap feeder, but obviously, other means of supplying end caps to the delivery chute 5 could be employed.

The chute 5 delivers the end caps 3 to the bonding agent dispensing stage 8, which preferably is dead level. Positioned at this stage is a dispenser 9 which is arranged to eject bonding agent in a predetermined amount, as in a plurality of drops 10, uniformly where the tube end is to be bonded thereto. A pair of photocells 11 is arranged to have the beam of light therebetween interrupted by an end cap in the position 8, and thus detect the presence of an end cap when ready for reception of bonding agent from the dispenser 9, so that the dispenser ejects bonding agent only when actuated by the photocells 11. The bonding agent is flowable, and the drops soon run together to form a pool, which will of course be of uniform depth if stage 8 is level. Uniform distribution of bonding agent on the end cap prior to application of a tube end thereto is unsured by adjusting the rate of travel of the caps along the stage conveyor from point 8 to point C, and the length and temperature of the conveyor between these points.

From stage 8, the end cap is directed by pivoted pusher bar 21 to the stage conveyor 12 which is stationary, but nonetheless conveys the caps to the next operation. Pusher bar 21 is actuated automatically upon completion of the deposition of bonding agent on the end cap by dispenser 9.

The conveyor 12 in this portion 13 is provided with heating means to maintain a temperature appropriate for keeping the bonding agent flowable until the open end of the tubular filter element can be applied. Beyond point 8, the stage conveyor 12 separates at point 14 into two tracks, A and B. Selected caps can be directed into track A, at right angles to track B, by a pusher bar 15, actuated automatically and at predetermined intervals in response to a tripper 16. Thus, the tripper 16 can be arranged to count and to skip every other cap, if desired, and push only alternate caps onto track A, or more or less than this, as required. It is evident that additional tracks can be furnished, if additional capacity is required, equipped in similar manner to direct caps into them.

The single operator required can stand at the position shown at C, and in this position can deal with end caps just beyond junction 14 in either track A or track B. The operator pushes a filter cylinder firmly in position on the cap, into the pool of bonding agent. The rate of travel of the composite along the stage conveyor, which is heated over sections 17 and 18 of each track A and B, respectively, from this point to the accumulation tables 19 and 20, together with the temperature and length of the stage, are so adjusted as to ensure effecting of a firm bond by the time the composite reaches the table.

If, for example, a thermoplastic bonding agent is employed which hardens on cooling, then the temperature over sections 17 and 18 of tracks A and B will be progressively reduced as the cap progresses towards the accumulation tables 19 and 20, so that by the time the composites are delivered to the tables, the bonding agent will have solidified, completing the seal. On the other hand, if a thermosetting adhesive is employed, which must be cured to bring it to the infusible solidified stage, then the temperature of the tracks A and B is so adjusted that the cure will be completed and the resin solidified by the time the composite is delivered to the accumulation tables. For example, an epoxy resin adhesive can be employed in a partially cured viscous stage, and the temperature of the stages A and B will then be kept at approximately 250 to 400° F., and the travel time from the junction 14 to the accumulation tables 19 and 20 will be adjusted to require approximately five minutes, thus ensuring completion of the cure by the time the composite reaches the tables. The modifications necessary to meet the requirements of any particular adhesive thus can readily be effected by anyone skilled in this art, and the automatic features of the apparatus can thus be realized.

Customarily, a tubular or cylindrical filter element will be provided with caps at each end. Consequently, the operator will normally retrieve a composite having only one cap just before it is delivered to the accumulation table of either track, and return it to the position just beyond junction 14, at which position the composite can be inverted, and the remaining open end of the tube pushed into another end cap. It will then be bonded thereto, delivered automatically as a completed filter element to the accumulation table.

Figure 2:
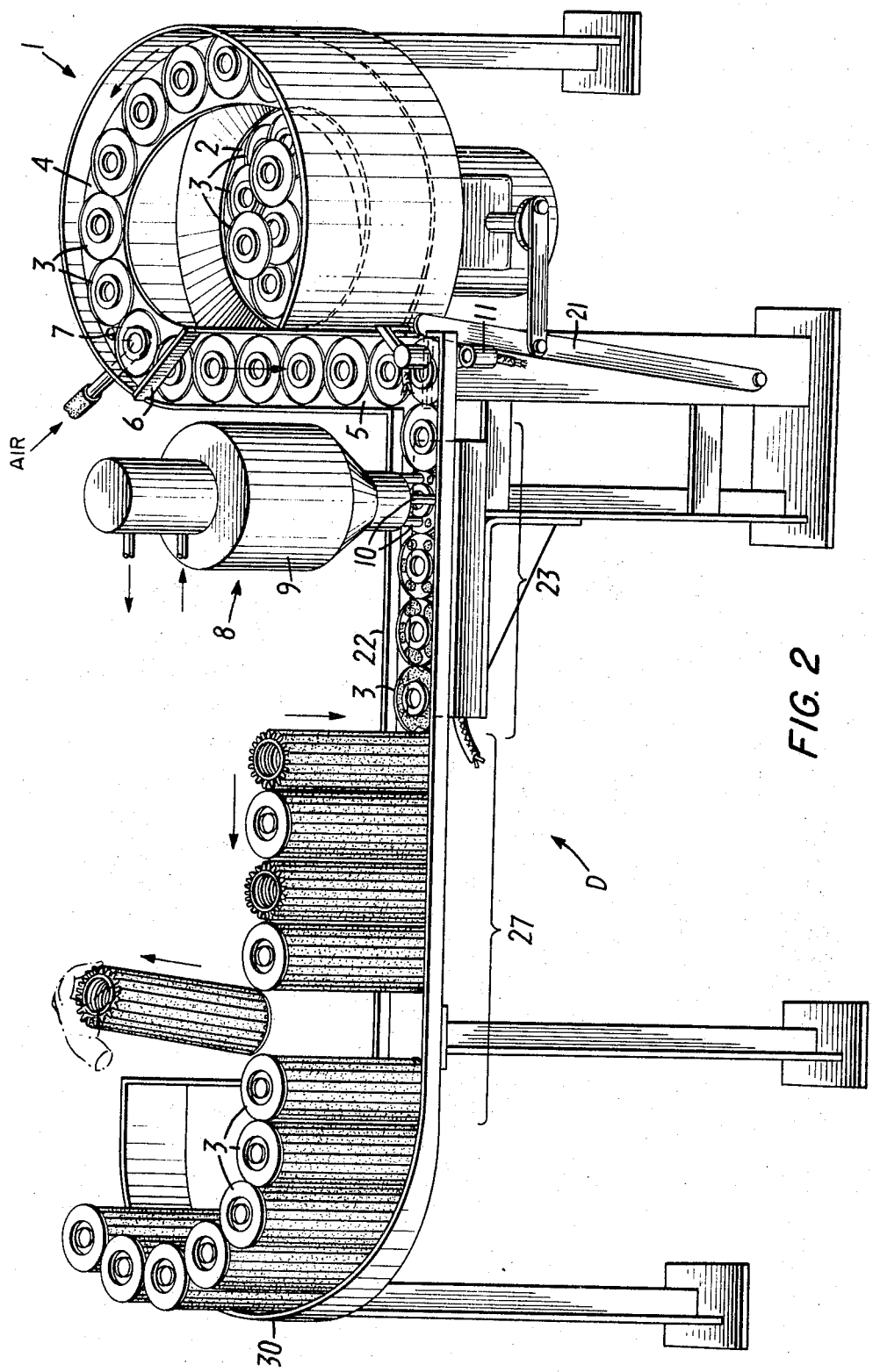
FIGURE 2 is a perspective view of another apparatus of the invention, similar to that of FIGURE 1, but with only one assembly line.
Figure 3:
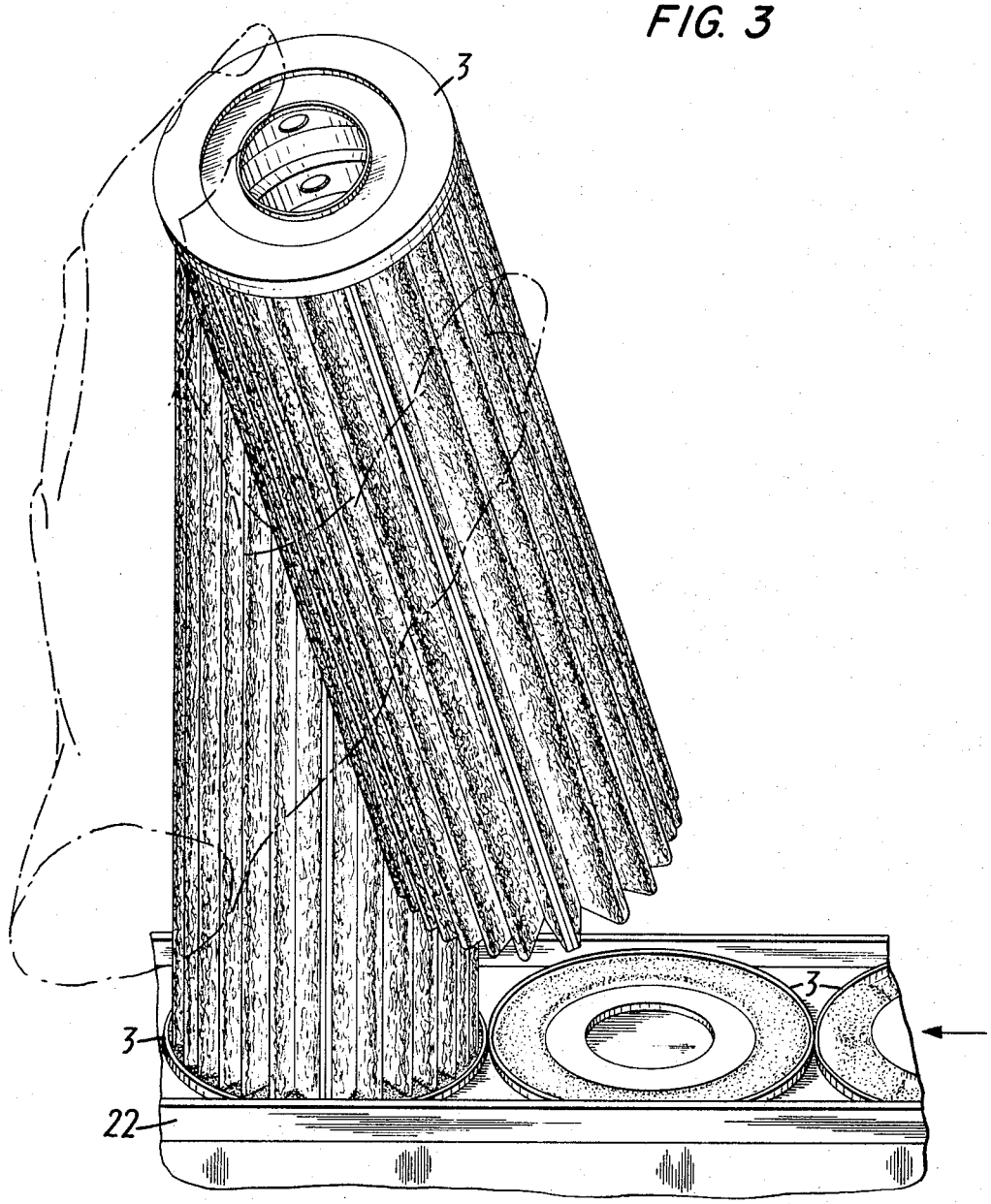
FIGURE 3 is a view of a completed filter element in position on the conveyor stage of the apparatus of FIGURE 2, just before delivery to the accumulation table.

FIGURE 2 is a perspective view of another apparatus of the invention, similar to that of FIGURE 1, but with only one assembly line.

The apparatus shown in FIGURE 2 also comprises a cap feeder 1 of conventional Syntron type having a rotatable central storage reservoir 2 containing a supply of end caps 3 and a peripheral helical ramp 4 for carrying the end caps 3 up from the reservoir 2 to a delivery chute 5. As the cap resevoir is rotated, the end caps 3 are continuously delivered to the ramp 4 and this rotation is accompanied by considerable vibration, in accordance with known techniques, to ensure slipping off of excess caps from the ramp 4 to the reservoir 2. Positioned at a point on the ramp adjacent the delivery chute 5 is a feeler 6 which prevents passage of more than one cap at a time beyond this point. At the feeler, also in conventional manner, an air blast is emitted through the ramp 4 from duct 7 to push any end cap which is not upside down off the ramp 4, back to the reservoir, but to leave undisturbed in position on the ramp a cap which is upside down, in proper position for reception of bonding agent.

The chute 5 delivers the end caps 3 to the bonding agent dispensing stage 8, which preferably is dead level. Positioned at this stage is a dispenser 9 which is arranged to eject bonding agent in a predetermined amount, as in a plurality of drops 10, uniformly where the tube end is to be bonded thereto. A pair of photocells 11 is arranged to detect the presence of an end cap in the position 8 when ready for reception of bonding agent from the dispenser 9, so that the dispenser ejects bonding agent only when actuated by the photocells. The bonding agent is flowable, and the drops soon run together to form a pool, which will of course be of uniform depth if stage 8 is level. Uniform distribution of bonding agent on the end cap prior to application of a tube end thereto is ensured by adjusting the rate of travel of the caps along the stage conveyor from point 8 to point D and the length and temperature of the conveyor between these points.

From stage 8, the end cap is directed by pusher bar 21 to the stage conveyor 22, which is stationary, but nonetheless conveys the caps to the next operation. The conveyor 22 in this portion 23 is provided with heating means to maintain a temperature appropriate for keeping the bonding agent flowable until the end of a tubular filter element can be applied.

The single operator required can stand at the position shown at D, and in this position can deal with end caps on the stage 22. The operator pushes a filter cylinder firmly in position on the cap, into the pool of bonding agent. The rate of travel of the composite along the stage conveyor, which is heated over section 27 from this point to the accumulation table 30, together with the temperature and length of the stage, are so adjusted as to ensure effecting of a firm bond by the time the composite reaches the table.

If, for example, a thermoplastic bonding agent is employed which hardens on cooling, then the temperature over section 27 will be progressively reduced as the cap progresses towards the accumulation table 30, so that by the time the composites are delivered to the table, the bonding agent will have solidified, completing the seal. On the other hand, if a thermosetting adhesive is employed, which must be cured to bring it to the infusible solidified stage, then the temperature of the track is so adjusted that the cure will be completed and the resin solidified by the time the composite is delivered to the accumulation table. For example, an epoxy resin adhesive can be employed in a partially cured viscous stage, and the temperature will then be kept at approximately 250 to 400° F., and the travel time from the dispenser 9 to the accumulation table 30 will be adjusted to require approximately five minutes, thus ensuring completion of the cure by the time the composite reaches the table. The modifications necessary to meet the requirements of any particular adhesive thus can readily be effected by anyone skilled in this art, and the automatic features of the apparatus can thus be realized.

Customarily, a tubular or cylindrical filter element will be provided with caps at each end. Consequently, the operator will normally retrieve a composite having only one cap just before it is delivered to the accumulation table of either track, and return it to the position just beyond the dispenser 9, at which position the composite can be inverted, and the remaining open end of the tube pushed into another end cap. It will then be bonded thereto, delivered automatically as a completed filter element to the accumulation table.

The obtention of a leakproof secure seal between the end cap and the cylindrical filter normally requires the application of both heat and pressure. In the apparatus and process of the invention the heat is furnished at the conveyor stage by appropriate heaters. The pressure is furnished by the weight of the filter element itself, since the curing or bonding is effected with the filter element resting on the end cap in the pool of bonding agent applied to the end cap at the dispenser. The required pressure is obtained by this means, and the application of pressure to both end caps during curing or bonding is obtained in exactly the same manner and amount. The conveyor stage is readily set at an absolutely or substantially level position, thus assuring application of uniform pressure to all portions of the end cap, and a uniform distribution of the bonding agent throughout the sealing area. Inasmuch as the bonding agent applied to the end cap will normally be fluid, even though the bonding agent may have a high viscosity under the bonding conditions, fluid flow can be depended upon to ensure a uniform distribution of bonding agent throughout all of the surface area of the end cap. Such uniformity of distribution is facilitated by uniform application of bonding agent to all of the surface area of the end cap at the dispenser, and a slow rate of travel of the cap along the stage conveyor to the point of insertion of the tubular element thereto.

The process and apparatus of the invention are applicable to tubular filter elements of any configuration. An end cap appropriate to the configuration of the tubular filter element is of course employed in each case. Normally, filter elements in cylindrical corrugated form are employed, but it will be apparent that the process and apparatus are applicable to tubular elements in any cross-sectional configuration, including plain, folded, convoluted and corrugated triangular, square, rectangular, elliptical, and indeed any polygonal filter tubes. The size and configuration of the convolutions in the case of a corrugated element are absolutely immaterial, and so also is the material of which the filter element and end caps are made.

The process and apparatus are applicable to filter elements made of any filter material. If the material has insufficient rigidity to be self-supporting, the tube can be made so by incorporation of a central core or support, such as a spring or tube of rigid metallic or plastic material, for instance, a perforated metal core or spring of conventional construction. It will usually be desirable in such a case to have the internal support of a length either equal to that of the filter element, or at least sufficient to enable it to be bonded to the end cap at the same time as is the filter element itself. The end caps can be furnished with appropriate raised or depressed portions to meet the ends of the filter support and the folds or convolutions and in accordance with the requirements of the filter assembly in which the filter element is to be used.

Thus, the process and apparatus of the invention are applicable to filter elements made of any porous sheet material having pores extending from surface to surface. One or several layers of the same or varying porosity can be employed, in close juxtaposition, or even bonded together, or also spaced apart. Paper, which can, if desired, be resin impregnated, is a preferred base material, since it yields an effective, versatile and inexpensive fluid-permeable filter medium. The invention is, however, applicable to papers and like sheet materials formed of any type of fiber, including not only cellulose fibers, but also synthetic resin fibers, and fibers of other cellulose derivatives, including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides and protein fibers of various sorts, such as zein and the alginates, glass, asbestos, potassium titanate, mineral wool, polystyrene, rubber, casein, hemp, jute, linen, cotton, silk, wool, and mohair. Also useful, in addition to papers, are textile fabrics, and woven and nonwoven fibrous layers of all kinds, such as felts, mats and bats made of fibrous materials of any of the types listed above.

The filter sheet material of which the filter elements of the invention are made can be, if desired, impregnated with a synthetic resin or cellulose derivative to increase its strength and resistance to wear by the fluid being filtered. The impregnating agent can be any material useful in the impregnation of papers and textile materials. Such materials are well-known in the paper and textile arts. The impregnating agents can be in liquid form, capable of undergoing solidification as by polymerization, cross-linking, or the like. They can also be in solid form, and applied to the base from a solution in an inert solvent, or as melts. Representative impregnating resins include phenol - formaldehyde resins, urea - formaldehyde resins, melamine - formaldehyde resins, polyester resins, and polyepoxide resins.

In case the filter material is impregnated with an impregnating resin for greater strength, and the resin is in an incompleted stage of polymerization, the curing of the resin impregnant can be effected simultaneously with the bonding of the end cap to the filter tube. Similarly, the composite can be given an oven or like heat treatment, after delivery to the accumulation table to complete the cure of any impregnant, and of the end cap bonding agent.

The end caps can be of any desired configuration, appropriate to the requirements of the filter assembly. Usually, at least one of the end caps will be provided with an aperture for delivery of filtered fluid from or unfiltered fluid to the interior of the structure. In many instances, both end caps will be apertured, particularly where a plurality of filter elements are to be connected together to form a long tube.

The bonding agent selected can be any of those available, and will be chosen for its ability to bond together the materials employed for the end caps and for the filter element. Thus, paper filter elements can be bonded to metal end caps, or to plastic end caps, sintered metal filters can be bonded to metal end caps, or to plastic end caps, etc. This is conventional and well-known to those skilled in this art, and forms no part of the instant invention.

The bonding agent must be a liquid, preferably viscous, to restrict flow and prevent leakage through any aperture in an end cap, or capable of being liquefied at the time adhesion is to be effected, and thereafter must be capable of undergoing solidification, as by polymerization, cross-linking, evaporation of a solvent, cooling, or the like. Liquid thermosetting resins are particularly advantageous, since they are effective in low concentrations and can be maintained in liquid form until it is desired to cause them to solidify. Representative liquid thermosetting resins include phenol - formaldehyde resins, urea - formaldehyde resins, melamine - formaldehyde resins, polyester resins and polyepoxide resins.

The liquid polyepoxide resins are particularly preferred. The polyepoxides that can be used in this invention can be saturated or unsaturated, aliphatic, cycloaliphatic, aromatic, or heterocyclic and may be substituted if desired with substituents, such as chlorine atoms, hydroxyl groups, ether radicals, and the like. They may also be monomeric or polymeric.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4-epoxybutoxy)diphenyldimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis and 2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl) propane (Bisphenol A), 2,2 - bis(4-hydroxy-phenol)-butane, 4,4'-dihydroxybenzophenone, bis(4-hydroxyphenyl) ethane, 2,2-bis(4-hydroxy-phenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

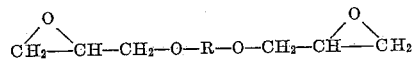

wherein R represents a divalent hydrocarbon radical of the dihydric phenol. The polymeric products will generally not be a single simple molecule but will be a complex mixture of glycidyl polyethers of the general formula

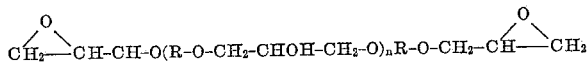

wherein R is a divalent hydrocarbon radical of the dihydric phenol, $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a while number. The polyethers may in some cases contain a very small amount of material with one or both of the terminal glycidyl radicals in hydrated form.

The preferred glycidyl polyethers of the dihydric phenols may be prepared by reacting the required proportions of the dihydric phenol such as Bisphenol A and the epichlorohydrin in an alkaline medium. The desired alkalinity is obtained by adding a basic substance, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Any known type of curing agent can be employed in conjunction with the polyepoxide resins employed in this invention. For example, organic aminos and quaternary ammonium compounds as in Patent No. 2,506,486, acidic organic orthophosphates as in Patent No. 2,541,027, sulfonic acid or sulfonyl halides as in Patent No. 2,643,243 and acid anhydrides either alone or with activators as in Patent No. 2,768,153. The organic amines are particularly preferred since they give the fastest rate of solidification. Aliphatic amines such as dimethyl, trimethylamine, triethylamine, 1,3-diaminopropane, hexamethylene diamine, diethylene triamine, triethylene tetramine, octylamine, decylamine, dioctylamine, and dodecylamine are exemplary of primary, secondary and tertiary aliphatic amines. The aliphatic amines preferably have from one to twelve carbon atoms. Also useful are the aromatic amines such as phenylene diamine, di(methylaminomethyl)phenol, tri(dimethylaminomethyl)phenol and diethylaniline.

The acid anhydrides are also quite useful as curing agents. These compounds are derived from mono or preferably, polycarboxylic acids, and possess at least one anhydride group

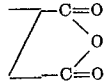

represents the carboxylic acid residue, and may be a saturated or unsaturated aliphatic, cycloaliphatic, aromatic or heterocyclic group. Exemplary are phthalic anhydride, maleic anhydride, "Nadic" methyl anhydride, succinic anhydride, chlorosuccinic anhydride, 6-ethyl-4-cyclo-hexadiene-1, 2-di-carboxylic acid anhydride, dodecenyl succinic acid anhydride, tetrahydrophthalic acid anhydride, pyromellitic dianhydride, and the like. Other anhydrides which can be used will be found mentioned in U.S. Patent No. 2,768,153.

Also useful bonding agents are solutions of solid thermosetting resins in suitable solvents.

Thermoplastic solid binders can also be employed as long as they can be softened to a tacky state, or liquefied, as by heating to above their softening point, to effect adhesion. Such thermoplastic materials can be employed, alone or in solution in a suitable solvent. Typical thermoplastic binders include polyethylene, polypropylene, polymethylene, polyisobutylene, polyamides, cellulose acetate, ethyl cellulose, copolymers of vinyl chloride and vinyl acetate, polyvinyl chloride, polyvinylidene chloride and vinyl acetate, polyvinyl chloride, polyvinylidene chloride, polyvinyl butyral, polytetrafluoroethylene, polytrifluorochloroethylene, lignin-sulfonate resins, starch binders, casein binders, and terpene resins, polyacrylic resins, such as polymethyl methacrylate, alkyd resins, and synthetic rubbers such as butadienestyrene polymers.

The following is claimed:

1. A process for mass producing filter cartridges in a continuous assembly line, applying the required assembling operation steps sequentially to the cartridges as they move along the line, comprising, in combination, the steps of arranging rimmed end caps for the cartridges in a row; progressively moving the row of end caps forward; applying a portion of flowable adhesive to each end cap; distributing the adhesive uniformly over the cap surface while retaining it within the rim of the cap and while maintaining the adhesive in a flowable condition; embedding one end of a tubular filter element in the adhesive to seal the entire end of the tubular filter element to the end cap; hardening the adhesive to form a bond retaining the end cap on the end of the element while progressively moving the row of capped cartridges forward, the hardening being coordinated timewise with the progressive movement so as to be substantially complete when the capped cartridge has reached the end of the line; retrieving the capped cartridge; inverting the cartridge, and embedding the other end thereof in an adhesive-containing end cap in the line; hardening the adhesive in a like manner; and collecting the completed cartridge at the end of the line.

2. A process in accordance with claim 1 wherein the adhesive is heat-curable and is hardened by progressively heating the cartridge as it is moved forward.

3. A process in accordance with claim 2 in which the filter element is also impregnated with a heat-curable material and heating is continued for a time sufficient to effect both curing of the impregnant and hardening of the adhesive.

4. A process is accordance with claim 1 in which the bonding of the end cap to the filter elements is effected under the pressure of gravity.

5. A process in accordance with claim 1 in which the adhesive is maintained in a flowable condition and distributed uniformly over the surface of the cap by applying heat thereto.

6. An apparatus for mass-producing filter cartridges in a continuous assembly line, comprising, in combination, feed means for supplying end caps for the cartridges in a continuous row; a conveyer for moving the end caps along the line, an adhesive dispenser located in position to dispense a predetermined amount of adhesive to each end cap in the line prior to insertion of a cartridge therein; heating means associated with the conveyer for applying an elevated temperature to the end caps and cartridges inserted therein sufficient to harden the adhesive to form a bond between the end caps and the cartridges while the cartridges are progressively moved forward by the conveyer, and means for collecting the end-capped filter cartridges.

7. An apparatus in accordance with claim 6 including means for maintaining the adhesive in a flowable condition and uniformly distributing it over the surface of the end cap prior to reception of a cartridge.

8. An apparatus in accordance with claim 6 wherein the conveyer has at least two branch tracks and in which the apparatus is provided with means for directing to the cartridges to one of said tracks.

9. An apparatus in accordance with claim 6 in which the speed of the conveyer is coordinated to the hardening of the adhesive.

10. An apparatus in accordance with claim 6 including a receptacle for collecting the end-capped filter cartridges.

References Cited

UNITED STATES PATENTS

| | | | |
|---|---|---|---|
| 2,788,834 | 4/1957 | Slaughter | 156—69 |
| 3,164,506 | 1/1965 | Lake | 156—69 |
| 3,170,826 | 2/1965 | Norton et al. | 156—69 |
| 3,238,699 | 3/1966 | Morton | 53—278 |
| 3,306,794 | 2/1967 | Humbert | 156—69 |

EARL M. BERGERT, *Primary Examiner.*

H. ANSHER, *Assistant Examiner.*